Figure 1:
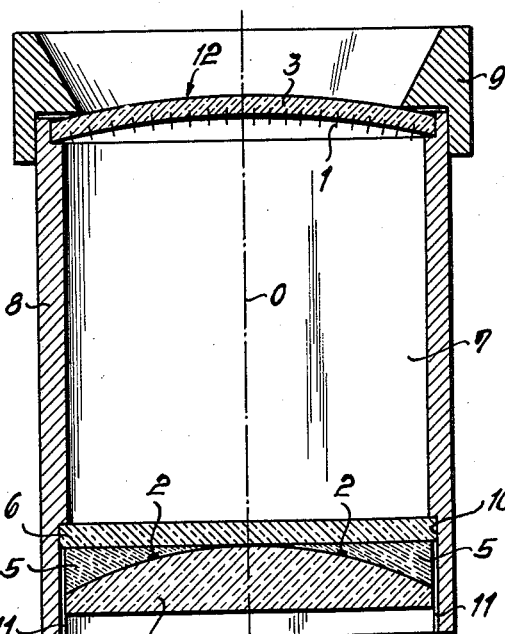

June 18, 1963  F. PAPKE  3,094,579
ALBADA TYPE VIEWFINDER WITH IMAGE FRAME IN
COMPOSITE REAR LENS ASSEMBLY
Filed Jan. 28, 1960

INVENTOR
Friedrich Papke,
By Blum, Moscovitz, Friedman & Blum
Attorneys

3,094,579
ALBADA TYPE VIEWFINDER WITH IMAGE FRAME IN COMPOSITE REAR LENS ASSEMBLY

Friedrich Papke, Braunschweig, Germany, assignor to Voigtlander A.G., Braunschweig, Germany, a corporation of Germany
Filed Jan. 28, 1960, Ser. No. 5,145
Claims priority, application Germany July 3, 1959
4 Claims. (Cl. 88—1.5)

This invention relates to view finders for photographic cameras and it has particular relation to Albada finders of the type described hereinafter.

It has been found that in Albada finders for photographic purposes it is advantageous to apply the frame to be reflected to a spherical surface and to include this sensitive frame, for its protection, in a cementing layer between two glass surfaces. If this is carried out with a block-shaped structure, then the intermediate finder block, which is cemented to the frame-carrying element arranged on the eye-side, will participate in the protection. Such finders are advantageous in many respects, but they are expensive, while, in many frequently occurring cases, structures which cost less are required. In such cases, the intermediate block is omitted and the front lens which carries the partially permeable hollow mirror, is separated by an air space relative to the frame carrier. The two optical elements are held at the required axial spacing by a finder casing. In spite of this protection of the finder from external influences, it has been found advantageous, in Albada finders having an intermediate air space, to additionally protect the frame-carrying surface of the element arranged on the eye-side, by embedding between two glass surfaces. The present invention relates to Albada finders in which this kind of additional protection is provided for.

In known embodiments of such finders, a plano-convex lens is used as the frame-carrying member, the convex surface of which carries the frame to be reflected. To this convex surface, a plano-concave lens is cemented, the concave surface of which registers with the frame-carrying surface. The manufacture of the plano-concave lens, which is used as a cover, necessarily involves considerable expense, although the optical effect of the Albada finder is not improved by the plano-concave element.

The main object of the present invention is to simplify the manufacture and reduce the production cost of the element used to protect the frame-carrying surface.

This is attained, according to the present invention, by using, instead of the plano-concave lens, a plane parallel plate of glass or transparent synthetic plastic and filling the interspace between the convex frame-carrying surface and the plane surface of said plate with a cement which has the same index of refraction as the plano-convex lens.

Additional features and advantages of the invention will be apparent from the following description and the appended drawings which diagrammatically illustrate some embodiments of and best modes for carrying out the invention, to which the invention is not limited.

Figure 2:
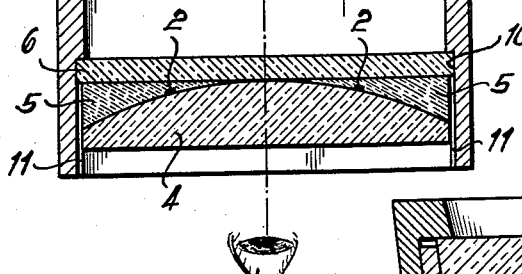
Figure 3:
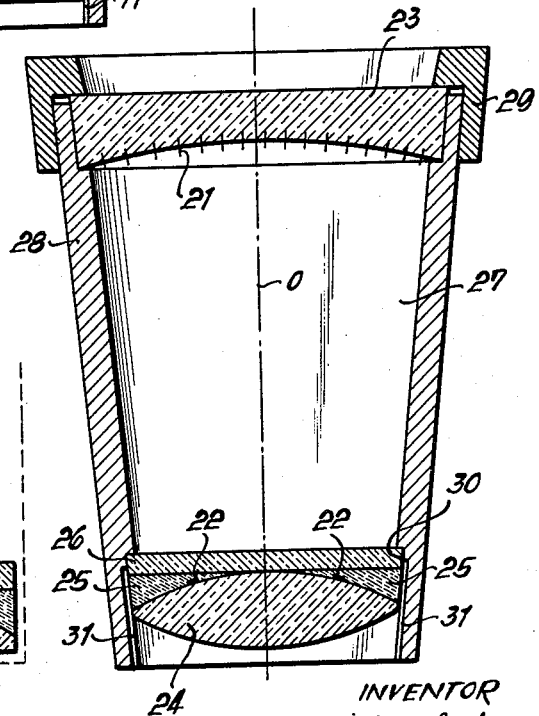
Figure 3:
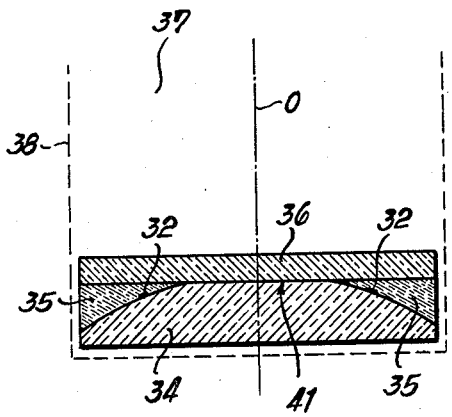

In the drawings,

FIG. 1 diagrammatically illustrates an Albada finder of simple structure which has an enlargement ratio of 1:1 and includes a frame-carrying and protecting assembly embodying the invention;

FIG. 2 diagrammatically illustrates an Albada finder based on the Newton principle, in which the features of the invention are incorporated, and FIG. 3 diagrammatically illustrates an advantageous modification of the frame-carrying and protecting assembly according to the present invention.

Referring now to the drawings in detail, in FIG. 1 the partially permeable mirror 1 for reflecting the image-limiting frame 2 into the image field of the finder is seated on the concave surface of meniscus 3, the refractive power of which amounts substantially to zero. The frame 2 to be reflected is deposited by vaporization on the inner convex surface of lens member 4. The latter is cemented together to the plane parallel glass plate 6, by means of the cement cushion 5. The air space 7 extends between meniscus 3 and glass plate 6. The mirror-carrier 3 and the rear assembly 4, 5, 6, which has no power of refraction, are held together by casing 8. In the example illustrated in FIG. 1, the meniscus 3 is additionally held and protected by a frame or bezel 9, which is applied to casing 8. The cementing cushion 5 serves also for connecting members 4 and 6 with casing 8.

In assembling the finder, the plane parallel glass plate 6 is inserted in a recess 10 of casing 8. Subsequently the necessary amount of the cementing composition is placed on the plane parallel plate and the lens 4, which carries the frame 2, is pressed against said plate. The cement completely fills the air space between lens 4 and the glass plate 6. Overflow channels 11 are provided, through which the excess cement is discharged and removed after the cement composition is hardened. The cement is preferably an epoxy resin or an ethoxyline resin which hardens due to polymerization. Members 4 and 6 may consist of transparent plastics, polyesters and the like. In the use of these materials, a polymerizable cement, consisting of analogous synthetic plastics, can be used for cementing together members 4 and 6.

As already mentioned above, cement 5 is selected in such manner that the cement has the same index of refraction as member 4, if the finder is intended to have no magnifying or reducing effect, i.e. is intended to have an effect of 1:1. However, it is, of course, possible to make, according to the present invention, Albada finders which reproduce the object observed as an enlarged or reduced image, in the manner known in Galilei finders and Newton finders. In such a case, it is preferred to select a cement which has an index of refraction differing from the index of refraction of member 4. Refraction will then occur on the interface between elements 4 and 5, and this refraction is included in the refraction of the respective finder system and is considered accordingly. Such a cement cushion can be used also for correction purposes, e.g. chromatic corrections, whereby the conventional optical calculating methods known from the prior art can be used.

In conformity with the Albada principle, the curvature of the concave mirror-carrying surface of the front meniscus 3 is selected in such manner that the frame 2 is located in the focal plane surface of mirror 1. Thus, the vertex of the convex surface of member 4 is located at about ½ of the radius of curvature of the mirror, measured on the optical axis O. The outer surface 12 of meniscus 3 has a radius which is larger, by the central thickness of this meniscus, than the radius of the inner surface carrying mirror 1.

The convex surface of lens 4, which carries the frame, and the surface of the plane parallel plate 6 facing eye 13 do not require fine finishing by polishing or the like, if the cement 5 has the same index of refraction as the material of lens 4.

FIGURE 2 illustrates an Albada finder based on the Newton principle and constructed according to the present invention. The partially permeable mirror 21 is seated on the inner concave surface of the plano-concave negative member 23 arranged toward the object to be viewed. This mirror 21 images the image limiting frame 22 at about infinity. Frame 22 is seated on the positive member 24, arranged toward the eye, and member 24 is a biconvex lens in this embodiment. By means of cement 25, the inner surface of biconvex lens 24 is firmly connected with the plane eye-facing surface, of the plane parallel plate 26, which is arranged adjacent the large air space 27. The finder casing, which is similar to that shown in FIG. 1, is shown in FIG. 2 at 28, while 29 denotes a protective frame or bezel on the front or object side. A seat, provided in casing 28 for plate 26, is shown at 30 and an overflow channel, for the discharge of excess cement during assembling the finder, is shown at 31.

FIGURE 3 diagrammatically illustrates an advantageous embodiment of a frame-carrying assembly. The cemented member shown in FIG. 3 can be used in finders according to FIGS. 1 and 2. In this case, the cement 35 must have the same index of refraction as the frame carrier 34, which is cemented to the plane parallel plate 36. Member 34 does not have here a continuous spherical surface, but has an annular spherical surface only in its outer zone, particularly where the frame 32 to be reflected is arranged. In the central zone 41, the lens 34 is flattened to provide a plane surface which is perpendicular to the optical axis O. This embodiment has the advantage that, during cementing together of parts 34 and 36, tilting is prevented, as the surfaces to be cemented are plane in the center and can be easily and safely assembled on a wide base. In order to avoid any adverse effect in the optical image formation, care has to be taken that the indices of refraction of lens 34 and cement 35 should be in strict conformity with each other. The large air space of the Albada finder is shown in FIG. 3 at 37 and the finder casing is indicated at 38.

By way of example, the lens 4 shown in FIG. 1 may consist of a silicate glass having an index of refraction of 1.51 to 1.53 and the cementing layer 5 may consist in this case of an epoxy resin cementing composition having also an index of refraction of 1.51 to 1.53. The plate 6 in FIG. 1 may consist of any glass. Furthermore, likewise by way of example, the lens 24 shown in FIG. 2 may consist of crown glass having an index of refraction of 1.51 to 1.64 and the cementing layer 25 may consist of an epoxy resin composition having an index of refraction of 1.51 to 1.58. The plate 26 in FIG. 2 may consist of mirror glass or flint glass. As mentioned above members 4, 6 (FIG. 1), 24, 26 (FIG. 2) and 34, 36 (FIG. 3) may consist of suitable plastics such as acrylate resins, e.g. polymers of methacrylate esters, and polyester resins. The finder shown by way of example in FIG. 2 may have a reducing effect of 0.3 to 0.95 in analogy to Newton finders.

It will be understood from the above that this invention is not limited to the specific members, designs, arrangements, materials and other details specifically described above and illustrated in the drawings and can be carried out with various modifications without departing from the scope of the invention as defined in the appended claims.

What is claimed is:

1. An Albada type viewfinder comprising, in combination, a front, object-facing lens having a concave inner surface carrying a partially light-permeable mirror; a rear lens assembly axially spaced by an air gap from said front lens and mounting an image limiting frame in substantially the focal plane of said mirror for imaging by the latter at substantially infinity, said assembly including a first plano-parallel optical element toward said front lens, a second optical element having an annular convex surface and a central plane surface in contact with the central portion of the facing plane surface of said first optical element and a dispersion lens of transparent, adherent and initially plastic material, having an index of refraction equal to that of said second optical element, disposed between and forming interfaces with the facing surfaces of said optical elements, and having an annular curved and concave surface facing and in contact with said second optical element; said frame being disposed on said annular convex surface of said second optical element; and a casing embracing and axially spacing said front lens and said rear lens assembly.

2. An Albada type viewfinder as claimed in claim 1, in which at least one of the facing surfaces between which the dispersion lens is located, is used without fine optical finishing.

3. An Albada type viewfinder as claimed in claim 1 in which said front lens is a meniscus without refractive power and having parallel inner and outer surfaces; said second optical element is a plano-convex lens having its annular convex surface located in substantially the focal plane of said mirror; said casing having a seat receiving said first optical element.

4. An Albada type viewfinder as claimed in claim 1 in which said front lens is a plano-concave negative lens having a plane object facing surface; said casing being formed with a seat receiving said first optical element.

References Cited in the file of this patent

UNITED STATES PATENTS

| | | |
|---|---|---|
| 2,092,782 | Tillyer | Sept. 14, 1937 |
| 2,909,204 | Somerville | Oct. 20, 1959 |

FOREIGN PATENTS

| | | |
|---|---|---|
| 202,442 | Austria | Mar. 10, 1959 |
| 996,990 | France | Sept. 5, 1951 |
| 1,004,913 | Germany | Mar. 21, 1957 |
| 1,048,142 | Germany | Dec. 31, 1958 |